(12) United States Patent
Hua et al.

(10) Patent No.: US 10,812,959 B2
(45) Date of Patent: Oct. 20, 2020

(54) DISTRIBUTING ALERT MESSAGES VIA UNLICENSED SPECTRUM

(71) Applicant: ALCATEL LUCENT, Murray Hill, NJ (US)

(72) Inventors: Suzann Hua, Walnut Creek, CA (US); Yigang Cai, Naperville, IL (US)

(73) Assignee: ALCATEL LUCENT, Murray Hill, NJ (US)

( * ) Notice: Subject to any disclaimer, the term of this patent is extended or adjusted under 35 U.S.C. 154(b) by 393 days.

(21) Appl. No.: 14/926,156

(22) Filed: Oct. 29, 2015

(65) Prior Publication Data
US 2017/0127256 A1    May 4, 2017

(51) Int. Cl.
| | |
|---|---|
| *H04W 4/90* | (2018.01) |
| *H04W 4/029* | (2018.01) |
| *H04L 12/18* | (2006.01) |
| *H04W 16/14* | (2009.01) |
| *H04W 84/04* | (2009.01) |
| *H04W 48/18* | (2009.01) |
| *H04W 84/12* | (2009.01) |
| *H04W 88/10* | (2009.01) |

(52) U.S. Cl.
CPC .............. *H04W 4/90* (2018.02); *H04L 12/18* (2013.01); *H04W 4/029* (2018.02); *H04W 16/14* (2013.01); *H04W 48/18* (2013.01); *H04W 84/042* (2013.01); *H04W 84/12* (2013.01); *H04W 88/10* (2013.01)

(58) Field of Classification Search
CPC .... H04W 84/02; H04W 84/12; H04W 84/042
See application file for complete search history.

(56) References Cited

U.S. PATENT DOCUMENTS

| | | | |
|---|---|---|---|
| 2010/0246506 A1* | 9/2010 | Krishnaswamy ... | H04W 72/085 370/329 |
| 2013/0288633 A1 | 10/2013 | Lemberg | |
| 2013/0344800 A1 | 12/2013 | Hua | |
| 2014/0273910 A1* | 9/2014 | Ballantyne .............. | H04W 4/90 455/404.1 |
| 2014/0273911 A1* | 9/2014 | Dunn ..................... | H04W 4/90 455/404.1 |
| 2015/0305037 A1 | 10/2015 | Zhang | |
| 2016/0249224 A1* | 8/2016 | Prasad ................. | H04W 16/14 |
| 2016/0277978 A1* | 9/2016 | Tan Bergstrom ........................... | H04W 36/0061 |

FOREIGN PATENT DOCUMENTS

WO    2012026857 A1    3/2012

OTHER PUBLICATIONS

PCT/US2016/057551 Written Opinion of The International Searching Authority and International Search Report dated Dec. 2, 2016.

* cited by examiner

*Primary Examiner* — Erin F Heard
*Assistant Examiner* — Donald H B Braswell
(74) *Attorney, Agent, or Firm* — Kramer Amado, P.C.

(57) ABSTRACT

An enhanced alert system provides for message delivery via unlicensed wireless spectrum (e.g., LTE-U or WiFi) alternatively or supplementary to message delivery via licensed wireless spectrum. Advantageously, the alert system can provide access to certain local areas not covered or insufficiently covered by licensed spectrum and can provide opportunistic traffic offloading from licensed spectrum.

14 Claims, 4 Drawing Sheets

DISTRIBUTING ALERT MESSAGES VIA UNLICENSED SPECTRUM

FIELD OF THE INVENTION

This invention relates generally to wireless telecommunication systems and, more particularly, to providing a capability for distributing alert messages, including public safety alerts and/or commercial alerts to mobile devices in an indicated alert area via unlicensed frequency spectrum (e.g., LTE-U, carrier grade or non-carrier-grade WiFi).

BACKGROUND OF THE INVENTION

A variety of alert notification systems are known for providing public safety alerts to the public. In one modality, public safety alerts are delivered by via Wireless Emergency Alerts (WEAs) (also known as commercial mobile alerts), from commercial mobile service providers to mobile devices operating within an indicated geographic area.

Exemplary practices and standards for WEAs are set forth in the following documents, each of which is fully incorporated herein by reference:

"Commercial Mobile Alert Service Architecture and Requirements," Version 1.0, dated Oct. 12, 2007 (describing general requirements of a United States Commercial Mobile Alert Service);

Third Generation Partnership Project (3GPP) technical specification TS 22.268 version 11.3.0, dated 2011 December (describing general requirements for a Public Warning System (PWS) in a 3GPP communication network);

3GPP TS 25.419, dated 2011 September (describing parameters of a Service Area Broadcast Protocol (SABP) in a 3GPP communication network);

3GPP TS 48.049, dated 2012 March (describing parameters of a Cell Broadcast Service Protocol (CBSP) in a 3GPP communication network);

ETSI TS 102 900, version 1.2.1, dated 2012 January (describing general requirements of a European Public Warning Service).

Generally, in accordance with the foregoing documents, a Commercial Mobile Service Provider (CMSP) receives an alert message from an alerting entity (e.g., an alert initiator, gateway or aggregator), responsive to an emergency event (e.g., without limitation, a dangerous weather condition, man-made disaster, or a child abduction emergency ("AMBER" alert)). The CMSP formats the alert in a manner consistent with the appropriate delivery protocol (e.g., SABP, CBSP) and delivers it via one or more cell sites/paging transceivers to targeted mobile devices. Depending on implementation, the cell sites/paging transceivers may include, e.g., radio network controllers (RNCs), base station controllers (BSCs) or Evolved Node Bs (eNodeBs or eNBs). The cell sites/paging transceivers deliver the WEAs via licensed radio spectrum, e.g., according to Long Term Evolution licensed (LTE-L) frequency bands defined by 3GPP that are licensed to the service provider. The alert may be delivered to all or a subset of the CMSP's coverage area and/or all or a subset of mobile devices supported by the service provider.

Advantageously, such Wireless Emergency Alerts are intended to be received by all mobile devices/users within an indicated geographic area associated with the emergency event. In practice, however, it is unlikely that any wireless service provider can completely cover all of the indicated area. Even in well developed big cities, there are some areas/locations in which devices/users do not have access, or do not have sufficient access to licensed (e.g., LTE-L) spectrum, thus may not receive WEAs delivered in customary fashion. Moreover, user access to licensed spectrum (and hence WEAs) can be denied or severely diminished during periods of high network traffic loading, which often coincides with emergency events.

Commercial alerts (for example and without limitation, promotions, notices, advertisements), similarly to emergency alerts, may be delivered by a CMSP to mobile devices within an indicated geographic area but not received due to coverage limitations or due to high network traffic loading.

Accordingly, there is a need for an enhanced alerting system for distributing alert messages, including public safety alerts and/or commercial alerts, that provides for increased coverage within an indicated geographic area relative to that which can be delivered by service providers through exclusive use of licensed (e.g., LTE-L) spectrum. Advantageously, the enhanced alerting system can provide access to certain local areas not covered or insufficiently covered by licensed spectrum and can provide opportunistic traffic offloading from licensed spectrum where dual connectivity is supported by mobile devices in the indicated geographic area.

SUMMARY OF THE INVENTION

These problems are addressed and a technical advance is achieved in the art by a feature in which alerts, including public safety alerts (e.g., Wireless Emergency Alerts, or WEAs) and/or commercial alerts, are delivered to users via unlicensed access spectrum, including without limitation, e.g., LTE unlicensed (LTE-U), carrier grade or non-carrier-grade WiFi, alternatively or supplementary to licensed spectrum, for certain local area access and opportunistic traffic offloading from licensed spectrum where dual connectivity is supported by mobile devices in the indicated geographic area.

In one embodiment, a gateway node receives an alert message directed to an indicated geographic area. The gateway node is associated with a primary carrier network characterizing a first network type adapted for use of licensed wireless spectrum (e.g., LTE-L spectrum) and is logically connected to a secondary network characterizing a second network type adapted for use of unlicensed wireless spectrum (e.g., WiFi or LTE-U spectrum). The gateway node in one implementation comprises a broadcast message center (BMC). Alternatively, the gateway node may comprise a base station (e.g., RNC or eNB) associated with the primary carrier network. The gateway node executes a technology selection policy to determine a delivery profile appropriate for the alert message, the technology selection policy including first selection criteria determinative of selection of licensed wireless spectrum and a second selection criteria determinative of selection of unlicensed wireless spectrum defining the delivery profile. The gateway node delivers the alert message to one or more mobile devices in the indicated geographic area according to the delivery profile.

In another embodiment, a network device (e.g., WiFi router, or WiFi router component of an integrated base station and WiFi router) receives an alert message from a gateway node (e.g., BMC or base station) associated with a primary carrier network, the alert message directed to an indicated geographic area. The primary carrier network characterizes a first network type adapted for use of licensed wireless spectrum (e.g., LTE-L spectrum). The network device is associated with a secondary network characterizing a second network type adapted for use of unlicensed wireless spectrum (e.g., WiFi or LTE-U spectrum). The network device, having received the alert message from the gateway node, distributes the alert message to one or more connected user devices in the secondary network via unlicensed wireless spectrum.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

Figure 1:
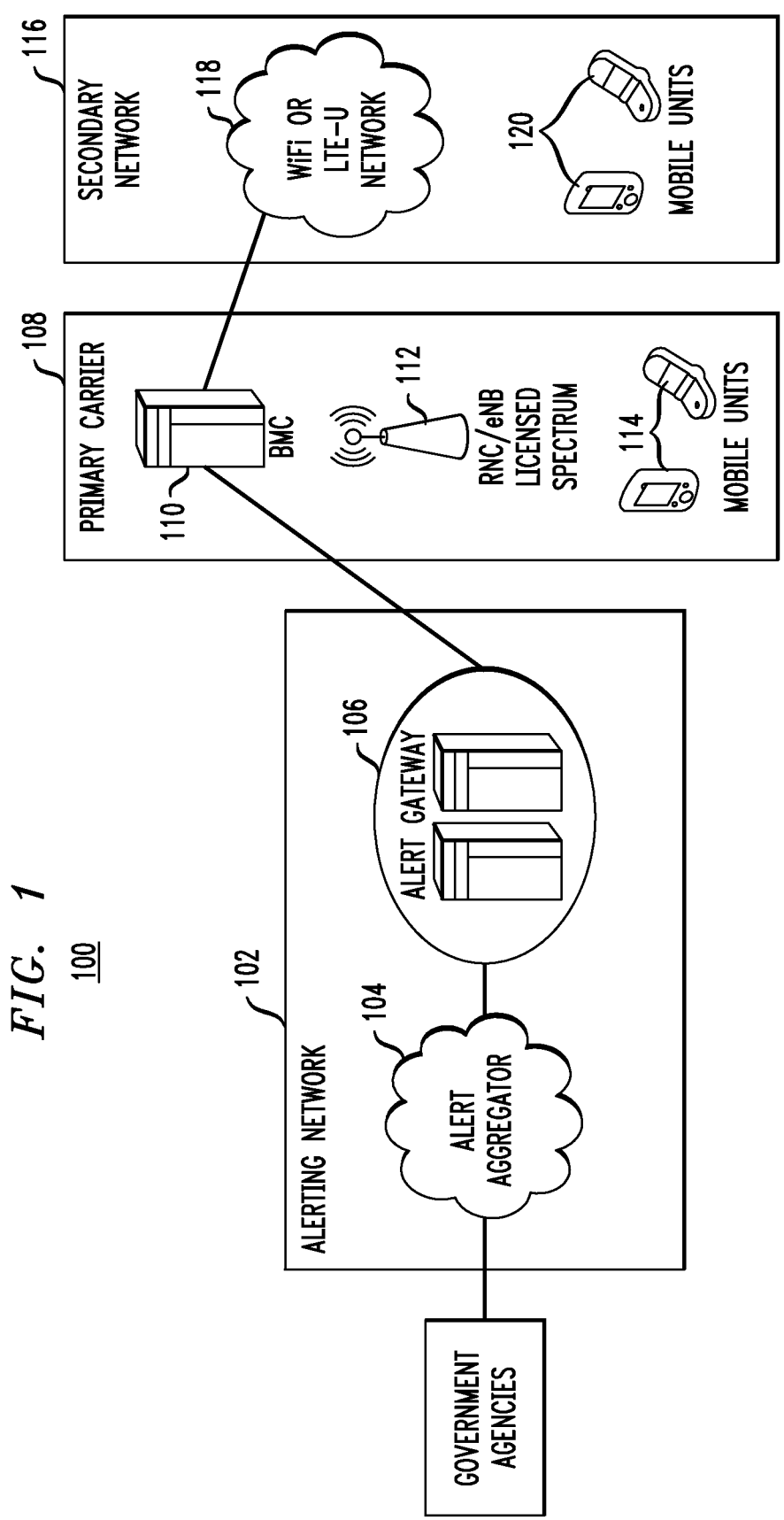
FIG. 1 is a functional reference model of an enhanced public safety alert system in which embodiments of the present invention may be implemented.
Figure 2:
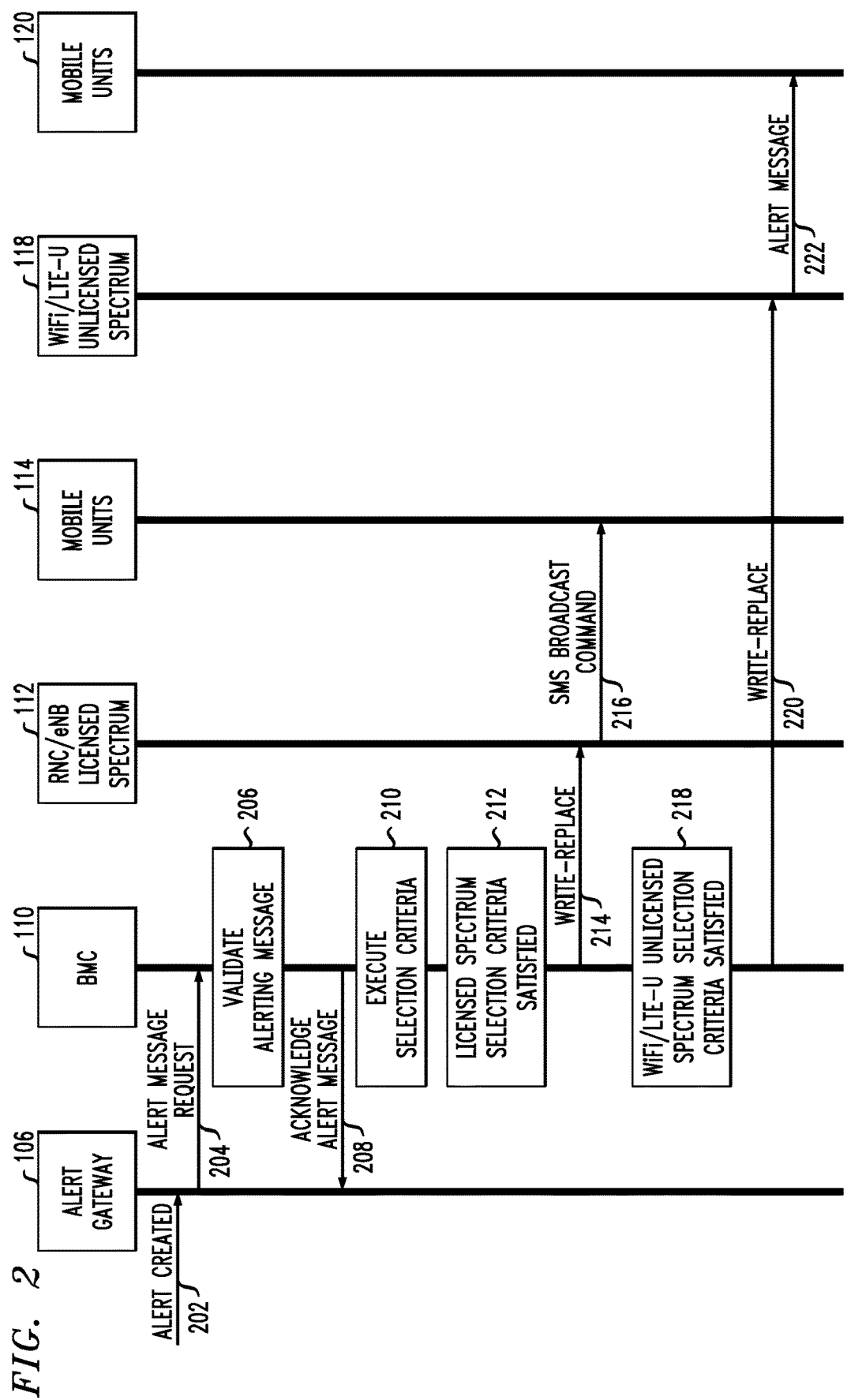
FIG. 2 shows a nominal message sequence for an enhanced public safety alert system according to embodiments of the present invention.
Figure 3:
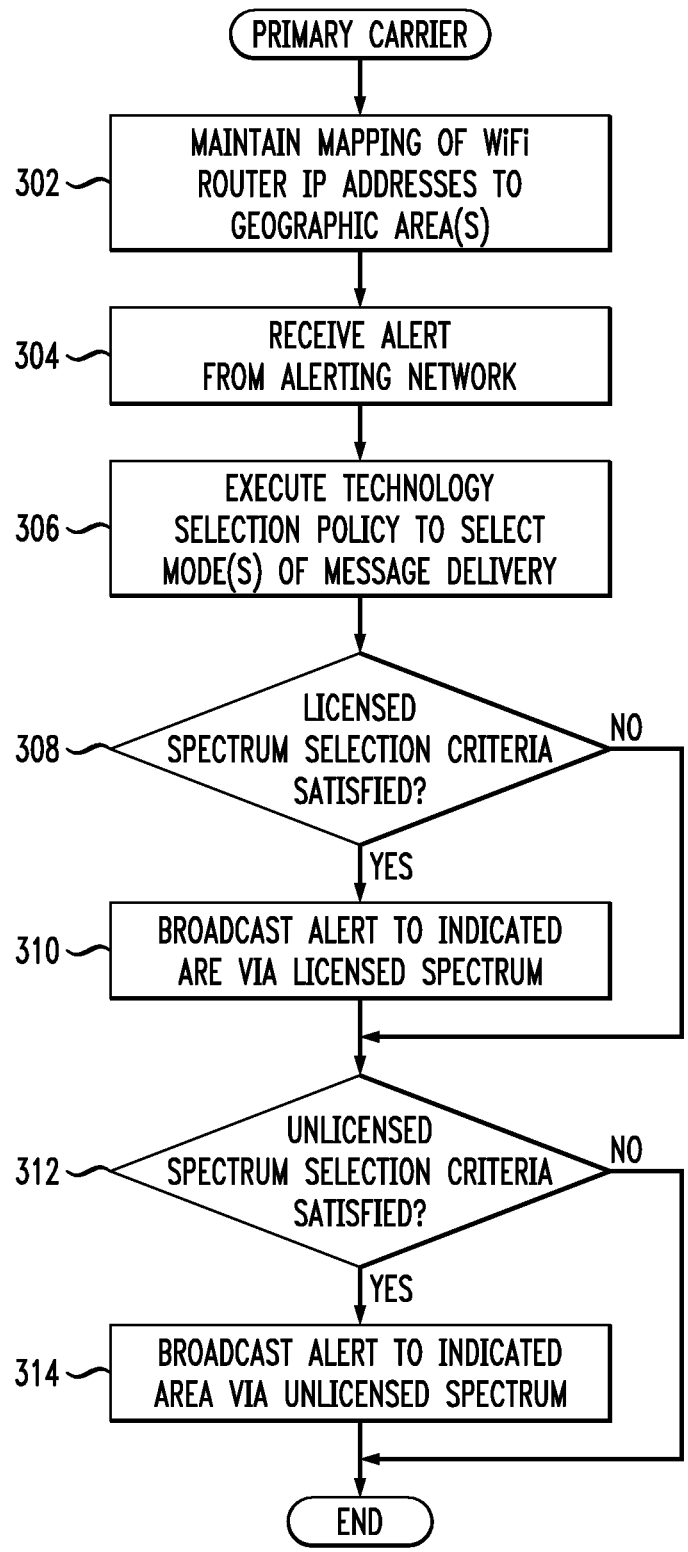
FIG. 3 is a flowchart showing steps performed by a gateway node of a primary carrier network to distribute alerts, including public safety and/or commercial alerts, according to embodiments of the present invention.
Figure 4:
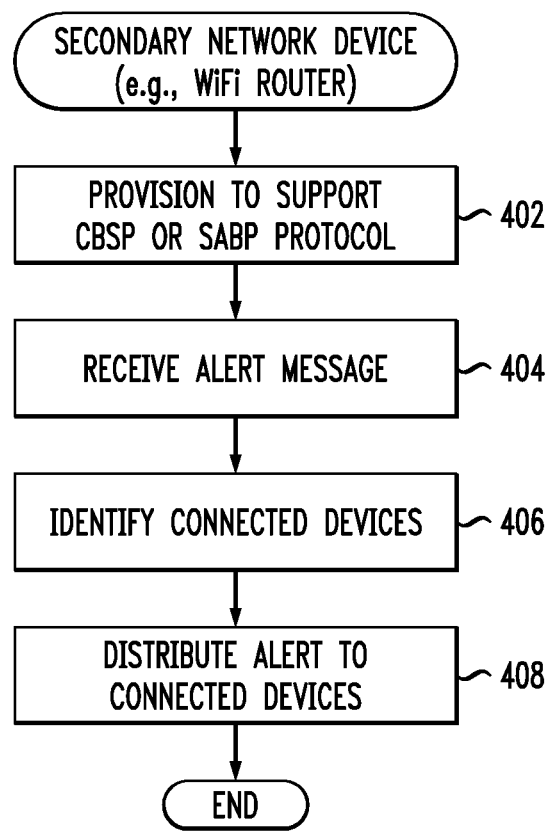
FIG. 4 is a flowchart showing steps performed by a Secondary Network device (e.g., WiFi router) to receive and distribute alerts, including public safety and/or commercial alerts, according to embodiments of the present invention.

An enhanced alerting system according to embodiments of the invention may be implemented in different modalities, for example and without limitation, a public safety alerting modality for distributing public safety alerts; and a commercial alerting modality for distributing commercial alerts, via unlicensed frequency spectrum (e.g., LTE-U, carrier grade or non-carrier-grade WiFi). For ease of reference, the detailed description is structured as follows. FIG. 1 and FIG. 2 provide an overview of an enhanced public safety alert system 100, i.e., a public safety alerting modality of an enhanced alerting system. FIG. 3 and FIG. 4 refer more broadly to a generalized alerting system for distributing alerts, including for example and without limitation, public safety and/or commercial alerts.

Turning initially to FIG. 1, there is shown a functional reference model of an enhanced public safety alert system 100 according to embodiments of the invention. Under this exemplary model, a Government administered Alerting Network 102 includes an "Alert Aggregator" 104 and an "Alert Gateway" 106. The Alert Aggregator 104 receives, aggregates and authenticates alerts originated by one or more alert initiators (e.g., governmental agencies, such as federal, state and/or local authorities). The alerts may comprise, for example, new, updated or canceled Wireless Emergency Alerts (WEAs) comprising, for example and without limitation, Presidential-level; Imminent threat to life and property; and Child Abduction Emergency or "AMBER" alerts. The Alert Aggregator 104 forwards the alerts to the Alert Gateway 106. The Alert Gateway 106 may reformat the alerts, if necessary (e.g., to conform with supported technologies, service profile or the like) and delivers the alerts to a Primary Carrier Network 108.

The Primary Carrier Network 108 includes a Broadcast Message Center (BMC) 110 and one or more cell sites/paging transceivers 112 (hereinafter "base stations") which may comprise for example and without limitation, radio network controllers (RNCs) or Evolved Node Bs (eNodeBs or eNBs). Upon receiving the alert, the BMC 110 formats the alert in a manner consistent with the appropriate delivery protocol (e.g., SABP, CBSP) and sends it to the base stations 112 having coverage areas corresponding to an indicated geographic area of the alert. The base stations then broadcast the alert to targeted mobile units 114 in their respective coverage areas via licensed radio spectrum, e.g., according to Long Term Evolution licensed (LTE-L) frequency bands defined by 3GPP that are licensed to the Primary Carrier. However, as has been noted, it is unlikely in practice that all of the targeted mobile units 114 will receive the alert via the Primary Carrier Network 108 due to coverage and/or access limitations associated with the licensed (e.g., LTE-L) spectrum.

According to embodiments of the present invention, the BMC 110, or alternatively, the base stations 112 define gateway nodes for receiving and distributing the alert. The BMC 110 or base stations 112 operate to enhance message distribution of public safety alerts by use of a Secondary Network 116, using unlicensed access spectrum, including without limitation, e.g., LTE unlicensed (LTE-U), carrier grade or non-carrier-grade WiFi, alternatively or supplementary to licensed spectrum, for certain local area access and opportunistic traffic offloading from licensed spectrum.

In one embodiment, distribution of alert messages via a combination of the Primary Carrier Network 108 and the Secondary Network 116 is determined by the BMC 110, or alternatively, the base station 112, according to a Technology Selection policy, considering for example, network loading conditions of the Primary Carrier Network, time period or pricing considerations. In instances where the Technology Selection Policy specifies message delivery via the Secondary Network 116, the alert messages are delivered to mobile units 120 in the Secondary Network via one or more appropriate physical resources 118 (e.g., comprising routers, servers, or the like) associated with the Secondary Network. In one example, the BMC 110 or base station 112 executes message delivery to mobile units 120 in the Secondary Network by delivering the message to certain WiFi router IP addresses mapped to the TAI (Tracking Area ID) of the Primary Carrier Network, which are accessible by mobile units 120 connected to the respective WiFi routers. The mobile units 120 (i.e., those connected to the WiFi routers and having access to messages delivered via the Secondary Network) may comprise all or part of the mobile units 114 (i.e., in the coverage area of the Primary Carrier Network) and/or may include mobile units not targeted by the Primary Carrier Network.

In one example, the BMC does not itself execute the technology selection policy and may not be logically connected to the secondary network, but the BMC forwards the alert message to a base station 112 (e.g., RNC or eNB) associated with the primary carrier network which executes the technology selection policy to determine the delivery profile. The base station 112 may be integrated with or logically connected to secondary network devices 118 (e.g., WiFi routers) characterizing a second network type adapted for use of unlicensed wireless spectrum (e.g., WiFi or LTE-U spectrum). If the delivery profile indicates selection of unlicensed wireless spectrum, the base station will broadcast the message from its WiFi component (in the instance that the base station is integrated with a WiFi router) or forward the alert message to WiFi routers 118 of the secondary network to broadcast the message to connected mobile devices 120. In the latter instance, the base station maintains a mapping of WiFi router IP addresses mapped to the TAI (Tracking Area ID) of the indicated geographic area of the alert.

FIG. 2 shows a nominal message sequence for an enhanced public safety alert system of the type shown in FIG. 1. The message sequence includes steps performed, where applicable, by the Alert Gateway 106, Broadcast Message Center (BMC) 110, base stations 112 (e.g., RNCs/eNBs) and mobile units 114 associated with the Primary Carrier Network (adapted for alert distribution via licensed access spectrum), and physical resources 118 and mobile units 120 associated with the Secondary Network (adapted for alert distribution via unlicensed access spectrum).

The message sequence of FIG. 2 includes the following steps:

At step 202, an alert is created and sent to the Alert Gateway 106.

At step 204, the Alert Gateway 106 sends an Alert Message request to the BMC 110, indicating an applicable geographic area for distribution of the alert.

At step 206, the BMC 110 validates the Alert Message request.

At step 208, the BMC 110 acknowledges the Alert Message request.

At step 210, the BMC 110 executes selection criteria according to a Technology Selection Policy, to select which wireless access technologies (e.g., between licensed access spectrum and unlicensed access spectrum), and hence which networks (e.g., between the Primary Carrier Network 108 and Secondary Network 116) are to be used for distribution of the alert.

At step 212, the BMC 110 determines that selection criteria is satisfied for distribution of the alert via licensed wireless spectrum, and hence via the Primary Carrier Network 108. Coincident to step 212, the BMC identifies the base stations 112 of the Primary Carrier Network 108 corresponding to the indicated alert area.

At step 214, the BMC 110 communicates the alert to the appropriate base stations 112 of the Primary Carrier Network 108. In one embodiment, this is accomplished within the parameters of a commercial mobile alert message (e.g., without limitation, a WRITE-REPLACE message).

At step 216, responsive to receiving the WRITE-REPLACE message, the base stations 112 of the Primary Carrier Network 108 communicate the alert to targeted mobile units 114 via respective SMS Broadcast Commands.

At step 218, the BMC 110 determines that selection criteria is satisfied for distribution of the alert via unlicensed wireless spectrum, and hence via the Secondary Network 116. Coincident to step 218, the BMC identifies one or more physical resources 118 (e.g., routers, servers, or the like) corresponding to the indicated alert area.

At step 220, the BMC 110 communicates the alert to the appropriate physical resources 118 of the Secondary Network 116. As shown, the BMC communicates the alert via one or more WRITE-REPLACE messages.

At step 222, responsive to receiving the WRITE-REPLACE message, the physical resources 118 of the Secondary Network 116 identify connected mobile units 120 and deliver the alert message to the connected mobile units 120.

As has been noted in relation to FIG. 1, according to an alternate embodiment, the base station 112 (e.g., RNC or eNB), rather than the BMC executes the technology selection policy to determine the delivery profile, and the base station 112 may be integrated with or logically connected to secondary network devices 118 (e.g., WiFi routers) characterizing the second network type. In this alternative embodiment, the steps of FIG. 2 are modified as follows:

Step 214, communication of the alert from the BMC 110 to the base station 112, occurs before steps 210 and 212.

At step 210, the base station 112, rather than the BMC 110, executes selection criteria according to a Technology Selection Policy, to select which wireless access technologies (e.g., between licensed access spectrum and unlicensed access spectrum), and hence which networks (e.g., between the Primary Carrier Network 108 and Secondary Network 116) are to be used for distribution of the alert.

At step 212, the base station 112, rather than the BMC 110, determines that selection criteria is satisfied for distribution of the alert via licensed wireless spectrum, and hence via the Primary Carrier Network 108. Coincident to step 212, the base station 112 confirms that it serves a coverage area corresponding to the indicated alert area.

At step 218, the base station 112, rather than the BMC 110, determines that selection criteria is satisfied for distribution of the alert via unlicensed wireless spectrum, and hence via the Secondary Network 116. Coincident to step 218, the base station identifies one or more physical resources 118 (e.g., routers, servers, or the like) corresponding to the indicated alert area. The base station may be integrated with or logically connected with the physical resources 118.

At step 220, the base station 112, rather than the BMC 110, communicates the alert to the appropriate physical resources 118 of the Secondary Network 116.

Turning now to FIG. 3, there is a flowchart of steps performed by a gateway device (in one example, the BMC 110 or alternatively, a base station 112) of a primary carrier network 108, within the context of a generalized alerting system for distributing alerts, which may include public safety and/or commercial alerts.

The BMC 110 is generally defined as any hardware device, server, platform, system, application or function, nominally associated with a Primary Carrier Network 108, that is operable to receive, format and broadcast alerts to targeted mobile devices 114 of the Primary Carrier Network via licensed wireless spectrum and further, according to embodiments of the present invention to direct certain alerts to a Secondary Network 116, adapted for message delivery to connected mobile devices 120 via unlicensed spectrum, to enhance coverage within an indicated area or to offload traffic from licensed spectrum.

The logical hardware configuration (not shown) of the BMC 110 includes a processor and memory, an input interface (logically connected to a source of alerting message) and output interfaces to a) base stations 112 of the Primary Carrier Network 108; and b) physical resources 118 (in one example, WiFi routers) of the Secondary Network 116. The steps of FIG. 3 may be performed, for example and without limitation, by the processor executing program code (e.g., including but not limited to operating system firmware/software and application software) stored in the memory.

The base station 112 is generally defined as any hardware device, server, platform, system, application or function or combination of such elements defining cell sites/paging transceivers including, e.g., radio network controllers (RNCs), base station controllers (BSCs) or Evolved Node Bs (eNodeBs or eNBs), nominally associated with a primary carrier network 110, and which may be integrated with or logically connected to resources 118 of a secondary network 116.

The logical hardware configuration (not shown) of the base station 112 includes a processor and memory, an input interface (logically connected to the BMC 110) and output interfaces to physical resources 118 of the secondary network (in one example, WiFi routers, in another example, an integrated WiFi component of the base station) of the Secondary Network 116.

The steps of FIG. 3 may be performed, for example and without limitation, by the processor of the BMC, or alternatively, the processor of the base station, executing program code (e.g., including but not limited to operating system firmware/software and application software) stored in the respective memory.

At step 302, the BMC 110, or alternatively, the base station 112 maintains a mapping of physical resources 118 of the Secondary Network 116 corresponding to one or more geographic areas in which distribution of alerts is supported. In one example, the physical resources 118 of the Secondary Network 116 comprise WiFi routers, and the geographic areas to be supported correspond to a respective one or more TAIs (Tracking Area IDs) of the Primary Carrier Network 108. In such case, the operator maintains a mapping at the BMC 110 or base station 112 of WiFi router IP addresses corresponding to each TAI. For example, TAI "X" may be mapped with WiFi routers' IP addresses A, B, C; TAI "Y" mapped with WiFi routers' IP addresses C, D, E and F, and so forth.

At step 304, the BMC 110, or alternatively, the base station 112 receives an alert message from an alerting authority. Coincident to receiving the alert message, the BMC 110 or base station 112 may perform validation and acknowledgement of the alert message, and geo-targeting to identify a targeted set of cell sites/paging transceivers (in one example, corresponding to one or more TAIs of the Primary Carrier Network) for broadcast of the alert. For convenience, steps of validation, acknowledgement and geo-targeting are omitted from FIG. 3.

At step 306, the BMC 110, or alternatively, the base station 112 executes a Technology Selection Policy, to select which mode(s) of message delivery, and which networks (e.g., between the Primary Carrier Network 108 and Secondary Network 116) are to be used for distribution of the alert. The Technology Selection Policy may be based on selection criteria including, for example and without limitation, traffic of the Primary Carrier Network, time criteria, or smart pricing criteria. In one embodiment, the selection criteria defines first selection criteria, determinative of selection of licensed wireless spectrum (i.e., the Primary Carrier network) and second selection criteria, determinative of selection of unlicensed wireless spectrum (i.e., the Secondary network) defining a delivery profile for distribution of the alert message.

Traffic criteria may involve, for example and without limitation, comparison of a Primary Carrier Network traffic indicator to one or more thresholds to select or deselect the Primary Carrier Network (corresponding to use of licensed access spectrum) and/or to select or deselect the Secondary Network (corresponding to use of unlicensed access spectrum).

Examples of traffic criteria may include:

If the traffic indicator is greater than a high threshold "X," deselect (i.e., don't use) the Primary Carrier Network (and hence don't use licensed access spectrum) for distribution of the alert; and/or if the traffic indicator is less than a low threshold "Y," select the Primary Carrier Network (and hence use licensed access spectrum) for distribution of the alert. WiFi selection options may include: always select WiFi (i.e., regardless of Primary Carrier Network traffic) or select WiFi only when Primary Carrier Network traffic is too high.

Examples of time criteria may include selection or deselection of the Primary Carrier Network and the Secondary Network based on times of day, or days of the week, such that certain days/times may use both licensed and unlicensed spectrum in parallel, certain days/times may use only licensed spectrum or only unlicensed spectrum.

Example of smart pricing criteria may include selection or deselection of the Primary Carrier Network and the Secondary Network based on which network is projected to be lower cost, or based on comparison of projected costs in relation to predetermined cost thresholds.

At step 308, having executed the Technology Selection Policy, the BMC 110, or alternatively the base station 112, determines whether selection criteria has been satisfied for use of the Primary Carrier Network (and hence use of licensed access spectrum). In the embodiment where the BMC executes the selection criteria, and selection criteria is satisfied for use of the Primary Carrier Network, the BMC at step 310 initiates broadcast of the alert via licensed access spectrum, by communicating the alert to the appropriate base stations of the Primary Carrier Network, which in turn communicate the alert to targeted mobile units in certain TAIs designated to receive the alert. In the embodiment where the base station executes the selection criteria, and selection criteria is satisfied for use of the Primary Carrier Network, the base station at step 310 initiates broadcast of the alert via licensed access spectrum, by communicating the alert to targeted mobile units in certain TAIs designated to receive the alert. If selection criteria is not satisfied for use of the Primary Carrier Network, the process proceeds to step 312.

At step 312, having executed the Technology Selection Policy, the BMC 110, or alternatively the base station 112, determines whether selection criteria has been satisfied for use of the Secondary Network (and hence use of unlicensed access spectrum). In the embodiment where the BMC executes the selection criteria, and selection criteria is satisfied for use of the Secondary Network, the BMC at step 314 initiates broadcast of the alert via unlicensed access spectrum, by communicating the alert to the appropriate physical resources 118 (e.g., WiFi routers) of the Secondary Network, for distribution to connected mobile units 120. Alternatively, in the embodiment where the base station 112 executes selection criteria, selection criteria is satisfied for use of the Secondary Network, and where the base station 112 is integrated with or has interfaces to secondary network resources 118, the base station at step 314 communicates the alert to the appropriate resources 118 for distribution to connected mobile units 120.

Now turning to FIG. 4, there is a flowchart of steps performed by a Secondary Network device (characterizing one of the physical resources 118 of the Secondary Network 116) to receive and distribute alerts, within the context of a generalized alerting system for distributing alerts, which may include public safety and/or commercial alerts.

The Secondary Network device may comprise, for example and without limitation, a WiFi router or any data network device that is subject to receive alerts from the BMC 110, or alternatively, from base stations 112, or a WiFi router integrated with a base station 112, that may distribute the alert to connected devices 120 via unlicensed wireless spectrum (e.g., LTE unlicensed (LTE-U), carrier grade or non-carrier-grade WiFi).

The logical hardware configuration (not shown) of the Secondary Network device includes a processor and memory, a network interface (logically connected to the BMC 110 and/or base stations 112) and output interfaces to connected user devices 120. The steps of FIG. 4 may be performed, for example and without limitation, by the processor executing program code (e.g., including but not limited to operating system firmware/software and application software) stored in the memory.

At step 402, the Secondary Network device is provisioned to support CBSP (Cell Broadcast Service Protocol) or SABP (Service Area Broadcast Protocol) public safety alert protocol, or generally any relevant message delivery protocol necessary to receive and identify alerts according to embodiments of the present invention.

At step 404, the Secondary Network device receives an alert message forwarded from the BMS 110, or alternatively, from one or more base stations 112 of the Primary Carrier Network 108.

At step 406, the Secondary Network device identifies a number of connected user devices 120 that are in communication with the Secondary Network device and eligible to receive the alert messages from the Secondary Network device. In one example, where the Secondary Network device comprises a WiFi router, the WiFi router identifies connected user devices at step 406 by checking the DHCP (Dynamic Host Configuration Protocol) clients table maintained by the WiFi router, which identifies, among other things, IP addresses and networking parameters associated with various user devices 120 connected to the WiFi router.

At step 408, having identified connected user devices, the Secondary Network device distributes the alert to the connected user devices 120 via unlicensed wireless spectrum, comprising, for example LTE unlicensed (LTE-U), carrier grade or non-carrier-grade WiFi. The Secondary Network device may distribute the alert to connected user devices 120 a designated number of times, during a particular display interval or compliance interval according to instructions received by the BMC 110 or as specified in reoccurrence display parameters of the alert.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a commercial mobile alert system including a primary carrier network logically connected to a secondary network, the primary network characterizing a first network type adapted for use of licensed wireless spectrum and the secondary network characterizing a second network type adapted for use of unlicensed wireless spectrum, a method comprising a gateway node of the primary carrier network:
   receiving a commercial mobile alert message directed to an indicated geographic area;
   executing a technology selection policy to determine a delivery profile appropriate for the commercial mobile alert message, the technology selection policy including first selection criteria determinative of selection of the licensed wireless spectrum and a second selection criteria determinative of selection of the unlicensed wireless spectrum defining the delivery profile;
   comparing primary carrier network traffic to a high threshold and a low threshold;
   deselecting the primary carrier network after the primary carrier network traffic is greater than the high threshold;
   selecting the primary carrier network after the primary carrier network traffic is less than the low threshold;
   delivering the commercial mobile alert message to one or more mobile devices in the indicated geographic area according to the delivery profile;
   specifying message delivery via one or both of the licensed wireless spectrum and the unlicensed wireless spectrum;
   maintaining a database identifying one or more WiFi routers in the indicated geographic area mapped to respective WiFi router IP addresses; and
   sending the commercial mobile alert message to the one or more WiFi routers in the indicated geographic area via the respective WiFi router IP addresses, wherein the indicated geographic area, which corresponds to one or more respective Tracking Area IDs of the primary carrier network, is mapped to the primary carrier network.

2. The method of claim 1, wherein the gateway node comprises a broadcast message center (BMC).

3. The method of claim 1, wherein the gateway node comprises a base station.

4. The method of claim 1, wherein the primary network comprises an LTE-L network and the secondary network comprises one of a WiFi network and an LTE-U network.

5. The method of claim 4, wherein the secondary network comprises the WiFi network, and, responsive to executing the technology selection policy, the delivery profile specifies message delivery via the WiFi network.

6. The method of claim 1, wherein the first selection criteria includes a traffic condition, comprising:
   selecting the licensed wireless spectrum as a mode of message delivery after the primary carrier network traffic does not exceed the low threshold; and
   deselecting the licensed wireless spectrum as the mode of message delivery after the primary carrier network exceeds the high threshold.

7. The method of claim 6, wherein the second selection criteria includes a traffic condition, comprising:
   selecting the unlicensed wireless spectrum as the mode of message delivery after the primary carrier network traffic exceeds the high threshold.

8. The method of claim 6, wherein the second selection criteria specifies selecting the unlicensed wireless spectrum as the mode of message delivery regardless of the primary carrier network traffic.

9. The method of claim 1, wherein the first and second selection criteria include one or more of:
   time criteria specifying selection or deselection of the licensed wireless spectrum or the unlicensed wireless spectrum based on one or more of: time of day, days of week; and
   pricing criteria specifying selection or deselection of the licensed wireless spectrum or the unlicensed wireless spectrum based on projected costs associated with use of the primary carrier network and the secondary network.

10. A gateway node, in accordance with a commercial mobile alert system including a primary carrier network logically connected to a secondary network, the gateway node associated with the primary carrier network and logically connected to the secondary network, the primary network characterizing a first network type adapted for use of licensed wireless spectrum and the secondary network characterizing a second network type adapted for use of unlicensed wireless spectrum, the gateway node comprising:
   an input interface;
   a primary network output interface;
   a secondary network output interface;

a memory; and at least one processor operably coupled to the input interface, the primary network output interface the secondary network output interface, and the memory and configured to:

receive a commercial mobile alert message directed to an indicated geographic area;

execute a technology selection policy to determine a delivery profile appropriate for the commercial mobile alert message, the technology selection policy including first selection criteria determinative of selection of the licensed wireless spectrum and a second selection criteria determinative of selection of the unlicensed wireless spectrum defining the delivery profile;

compare primary carrier network traffic to a high threshold and a low threshold;

deselect the primary carrier network after the primary carrier network traffic is greater than the high threshold;

select the primary carrier network after the primary carrier network traffic is less than the low threshold;

deliver the commercial mobile alert message to one or more mobile devices in the indicated geographic area according to the delivery profile;

specify message delivery via one or both of the licensed wireless spectrum and the unlicensed wireless spectrum;

maintain a database identifying one or more WiFi routers in the indicated geographic area mapped to respective WiFi router IP addresses, and send the commercial mobile alert message to the one or more WiFi routers in the indicated geographic area via the respective WiFi router IP addresses, wherein the indicated geographic area, which corresponds to one or more respective Tracking Area IDs of the primary carrier network, is mapped to the primary carrier network.

11. The gateway node of claim 10, comprising a broadcast message center (BMC).

12. The gateway node of claim 10, comprising a base station.

13. A network device for communicating alert messages, in accordance with a commercial alert system including a primary carrier network logically connected to a secondary network via a gateway node, the network device logically connected to the gateway node, the gateway node associated with a primary carrier network characterizing a first network type adapted for use of licensed wireless spectrum, the network device associated with a secondary network adapted for use of unlicensed wireless spectrum, the network device comprising:

an input interface;

an output interface;

a memory; and at least one processor operably coupled to the input interface, the output interface, and the memory and configured to:

receive a public safety alert message from the gateway node, the public safety alert message directed to an indicated geographic area;

compare primary carrier network traffic to a high threshold and a low threshold:

deselect the primary carrier network after the primary carrier network traffic is greater than the high threshold;

select the primary carrier network after the primary carrier network traffic is less than the low threshold:

distribute the public safety alert message to one or more connected user devices in the indicated geographic area via the unlicensed wireless spectrum;

maintain a database identifying one or more WiFi routers in the indicated geographic area mapped to respective WiFi router IP addresses, and send the commercial mobile alert message to the one or more WiFi routers in the indicated geographic area via the respective WiFi router IP addresses, wherein the indicated geographic area, which corresponds to one or more respective Tracking Area IDs of the primary carrier network, is mapped to the primary carrier network.

14. The network device of claim 13, comprising a WiFi router, the secondary network defining a WiFi network.

* * * * *